United States Patent [19]

Inuma et al.

[11] Patent Number: 4,851,897
[45] Date of Patent: Jul. 25, 1989

[54] IMAGE PICKUP SYSTEM HAVING A LENS ASSEMBLY AND MEANS FOR PROVIDING INFORMATION RELATING TO THE SPECTRAL CHARACTERISTIC OF THE LENS ASSEMBLY

[75] Inventors: Mutsumi Inuma; Masao Suzuki, both of Yokohama, Japan

[73] Assignee: Canon Kabushiki Kaisha, Tokyo, Japan

[21] Appl. No.: 284,855

[22] Filed: Dec. 13, 1988

[30] Foreign Application Priority Data

May 22, 1985 [JP] Japan ................... 60-108346
Sep. 11, 1985 [JP] Japan ................... 60-201371

[51] Int. Cl.$^4$ ............... H04N 9/73; H04N 5/225; H04N 5/232; H04N 9/04
[52] U.S. Cl. ...................... 358/29; 358/41; 358/55; 358/209; 358/225
[58] Field of Search ............ 358/29, 41, 43, 50, 358/51, 55, 225, 909, 29 C, 44, 209; 354/286, 412

[56] References Cited

U.S. PATENT DOCUMENTS

| | | | |
|---|---|---|---|
| 3,872,499 | 3/1975 | McConnell et al. | 358/51 |
| 4,118,713 | 10/1978 | Murakami et al. | 354/286 |
| 4,472,740 | 9/1984 | Doi | 358/55 |
| 4,477,161 | 10/1984 | Kawasaki et al. | 354/286 |
| 4,529,288 | 7/1985 | Nakai et al. | 354/286 |
| 4,782,355 | 11/1988 | Sakai et al. | 358/909 |

FOREIGN PATENT DOCUMENTS

| | | | |
|---|---|---|---|
| 3232920 | 3/1984 | Fed. Rep. of Germany | 358/51 |
| 57-42286 | 3/1982 | Japan | 358/51 |
| 57-193193 | 11/1982 | Japan | 358/51 |
| 58-114586 | 7/1983 | Japan | 358/41 |
| 58-130686 | 8/1983 | Japan | 358/51 |
| 59-101974 | 6/1984 | Japan | 358/41 |
| 60-4391 | 1/1985 | Japan | 358/29 C |
| 60-4392 | 1/1985 | Japan | 358/29 C |
| 60-26324 | 2/1985 | Japan | |
| 60-218995 | 11/1985 | Japan | 358/29 C |
| 60-254894 | 12/1985 | Japan | 358/29 C |

Primary Examiner—Edward L. Coles, Sr.
Assistant Examiner—Randall S. Svihla
Attorney, Agent, or Firm—Fitzpatrick, Cella, Harper & Scinto

[57] ABSTRACT

In an image pickup system such as a video camera having an adjusting circuit for adjusting a white balance in a color image signal, each interchangeable lens has a device for providing information on the spectral characteristic inherent in the lens. In one embodiment, a microcomputer is provided for processing the information on the spectral characteristic inherent in the lens. When the lens is mounted on the camera body incorporating the adjusting circuit, the information on the spectral characteristic of the lens is transmitted into the camera body by a mechanical arm whose length is representative of the spectral characteristic of the lens, thereby enabling the adjusting means to make a proper adjustment of the white balance for each lens having a different predetermined spectral characteristic.

33 Claims, 8 Drawing Sheets

| TEST COMMAND | COMMAND NAME | LEVEL | OPERAND | CODE | CONTENT | ANSWER DATA | KIND OF DATA EACH BYTE |
|---|---|---|---|---|---|---|---|
| | TEST COLOR | 1 | 0 | 48 | IDENTIFY SPECTRAL CHARACTERISTICS OF LENS | 2 | L R/G, L B/G |
| | TEST LOSS | 1 | 0 | 4A | IDENTIFY TRANSMITTANCE OF LENS | 1 | ← |
| | TEST ID | 1 | 0 | 49 | IDENTIFY MANUFACTURER, TYPE AND FUNCTIONS OF LENS | 7 | MANUFACTURER, TYPE AND FUNCTIONS OF LENS |

FIG. 7

IMAGE PICKUP SYSTEM HAVING A LENS ASSEMBLY AND MEANS FOR PROVIDING INFORMATION RELATING TO THE SPECTRAL CHARACTERISTIC OF THE LENS ASSEMBLY

This application is a continuation of application Ser. No. 861,876 filed May 12, 1986, now abandoned.

BACKGROUND OF THE INVENTION

1. Field of the Invention

The present invention relates to an image pickup system and more particularly it concerns an image pickup system that is equipped with an adjusting device for adjusting the white balance of a color image pickup signal in accordance with an optical characteristic of an interchangeable lens used with the system.

2. Description of the Prior Art

In conventional types of image pickup apparatus such as video cameras, the white balance of a color image pickup signal has been adjusted on the basis of information on the color temperature of the light emanating from an object and the spectral characteristic is so established as to match with that of a standard lens of commonly used lenses.

However, image pickup apparatus such as conventional types of video cameras equipped with interchangeable lenses have a disadvantage in that each lens has a different spectral characteristic. Therefore, even if a spectral characteristic of the standard lens is established and utilized along with information on the color temperature of light emanating from the object to properly adjust a white balance, the spectral characteristics of other interchangeable lenses actually used may be greatly different from that of the standard lens. Thus, suitable adjustment of white balance is prevented when lenses are interchanged even if an identical object is viewed.

SUMMARY OF THE INVENTION

According to one aspect of the present invention, there is provided a signal generation system which comprises conversion means, processing means, conducting means and information providing means. The conversion means produces an electrical signal in response to incident radiation. The processing means is arranged to process the electrical signal produced by the conversion means to generate a predetermined output. The processing means includes control means for controlling the output thereof. The conducting means conducts the radiation to the conversion means and has a predetermined radiation conductive characteristic. The information providing means provides information on the radiation conductive characteristic of the conducting means. And the control means in the processing means controls the output of the processing means in response to the information provided by the information providing means.

The conversion means and the processing means may be incorporated into a first unit while the conducting means may be incorporated into a second unit that is attachable to the first unit. The information providing means may be incorporated into either of the second unit or the first unit.

More particularly, in an image pickup system such as a video camera in accordance with the present invention, the conversion means, the processing means and conducting means may comprise an image pickup element, an image signal processing circuit and an image forming lens optical system, respectively. The control means may be comprised of a control circuit which controls the output of the processing circuit in response to the information on the spectral characteristic of the lens optical system provided by the information providing means. The information providing means may comprise a mechanical device for producing a signal representing a dimension, such as a height, of an element in the lens optical system that corresponds to the spectral characteristic of the lens optical system. The information providing means may also comprise a memory element that stores the information on the spectral characteristic of the lens optical system.

In the video camera that comprises a camera body and an interchangeable lens assembly, the first unit and the second unit may constitute the camera body and the interchangeable lens assembly, respectively.

When the processing means is arranged to process the signal produced from the conversion means to a plurality of signal components, the control means may control the balance of the signal components in the output signal of the processing means.

For example, in a color image pickup system where the image pickup element produces a color image signal and the processing circuit processes the signal into a plurality of color signal components, the control means may comprise an adjusting circuit or a control circuit for the adjusting circuit to control the balance of the color signal components in accordance with the information on the spectral characteristic of the lens optical system.

According to another aspect of the present invention, there is provided an apparatus for generating a signal in response to radiation conducted through optical means having a predetermined spectral characteristic, comprising converting means, detecting means and processing means. The converting mean converts the radiation conducted through the optical means into an electrical signal. The detecting means detects the spectral characteristic of the optical means. And the processing means processes the electrical signal produced from the converting means in response to the spectral characteristic of the optical means detected by the detecting means.

According to still another aspect of the present invention, there is provided an optical unit for an image pickup apparatus having converting means for converting radiation into an electrical signal and processing means for processing the electrical signal, comprising optical means and transmitting means. The optical means has a predetermined spectral characteristic and is arranged to conduct the radiation to the converting means in the image pickup apparatus. The transmitting means is arranged to transmit information on the spectral characteristic of the optical means to the processing means in the image pickup apparatus.

The above and other objects, features, aspects and advantages of the present invention will become apparent from the following description of the preferred embodiments thereof, taken in conjunction with the accompanying drawing.

BRIEF DESCRIPTION OF THE DRAWING

FIG. 7 is a table showing commands and data which are communicated between the lens and the camera body of the embodiment shown in FIG. 5;

DESCRIPTION OF THE PREFERRED EMBODIMENTS

Preferred embodiments of the present invention will be described below in detail with reference to the accompanying drawing.

Figure 1:
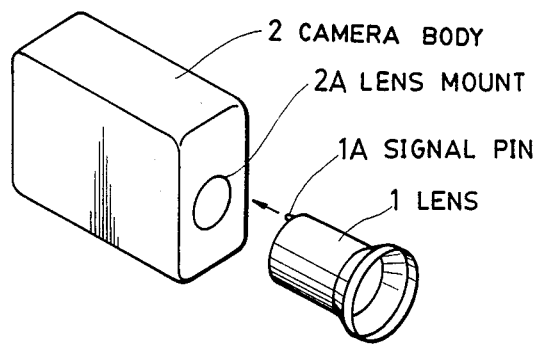
FIG. 1 is an exploded perspective view schematically showing the appearance of the body of a video camera of the interchangeable lens type and an interchangeable lens that together incorporate a first preferred embodiment of the present invention.

FIG. 1 shows the body of a video camera and an interchangeable lens therefore which incorporates a first preferred embodiment of the present invention. In this figure, reference numeral 1 denotes an interchangeable lens having a signal pin 1A and reference numeral 2 denotes a camera body having a lens mount 2A for mounting thereon the lens 1. The signal pin 1A of the lens 1 protrudes into the camera body 2 through the lens mount 2A when the lens 1 is mounted on the camera body 2.

Figure 2:
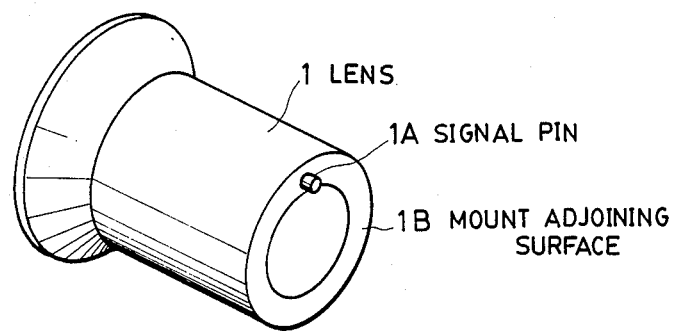
FIG. 2 is a perspective view showing the back of the lens illustrated in FIG. 1.

FIG. 2 is an enlarged view of the back of the lens 1 shown in FIG. 1. As shown in FIG. 2, the signal pin 1A is disposed on a mount adjoining surface 1B of the lens 1 and the protruding height thereof is determined in accordance with the spectral characteristic of the associated lens. That is, different interchangeable lenses having different spectral characteristics will have signal pins of different height the height of each pin being uniquely associated with the spectral characteristic of the particular lens.

Figure 3:
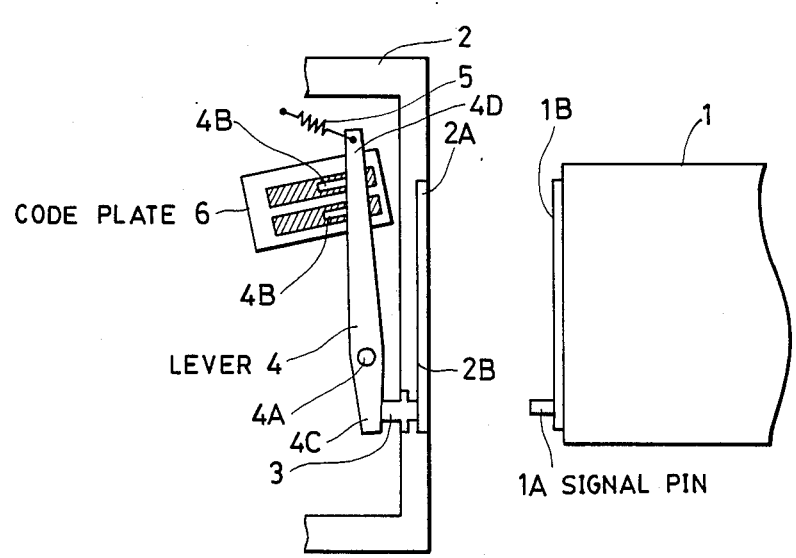
FIG. 3 is a longitudinal cross-sectional view of one example of the construction of certain portions of the lens mount of the camera body and of the lens shown in FIG. 1.

FIG. 3 shows one example of the internal construction at the lens mount 2A of the camera body 2 shown in FIG. 1. As shown in FIG. 3, a moving pin 3, which is mounted to be pressed inwardly of the camera body by the signal pin 1A upon fitting the lens 1 into the lens mount 2A, is slideably carried in the wall of the camera body defining a mount surface 2B which adjoins the mount adjoining surface 1B of the lens 1. Reference numeral 4 denotes a lever which is pivoted by the movable pin 3 engaging the tail end 4C thereof and amplifies the travel stroke or magnitude of movement of the pin 3. The lever 4 can be pivoted about a pivot shaft 4A and is urged in the counterclockwise direction by a spring 5 connected between its tip end 4D and the camera body 2 while the tail end 4C thereof engages the moving pin 3 as noted. Additionally, contact pieces 4B are attached near the tip end of the lever 4, and slideably contact a code plate 6 which is secured to a portion of the camera body 2. The code plate 6 functions to convert the travel stroke or magnitude of movement of the contact pieces 4B into an electrical signal output. The code plate 6 may be arranged to produce its output in digital form or analog form. A differential transformer or the like may also be used to generate the output electrical signal in addition to the code plate 6.

In accordance with the above described construction, when the lens 1 is fitted into the lens mount 2A of the camera body 2, the signal pin 1A of the lens 1 presses the movable pin 3 inwardly of the camera body. In this case, the movable pin 3 is pressed in by a distance corresponding to the protruding height of the signal pin 1A and in turn the lever 4 is rotated to move its tail end 4C by a related amount. Consequently, the lever 4 is pivoted in the clockwise direction about the pivot shaft 4A against the force applied by the spring 5, and concurrently, the contact pieces 4B of the lever 4 slide over the code plate 6. Therefore, the height of the signal pin 1A representing information on the spectral characteristics of the lens 1 is changed in the travel stroke or magnitude of movement of the contact pieces 4B over the code plate 6, and is thereby converted into a corresponding electrical signal. The electrical signal thus converted is supplied as electrical information on the spectral characteristic of the lens to white balance adjusting means as will be described below.

Figure 4:
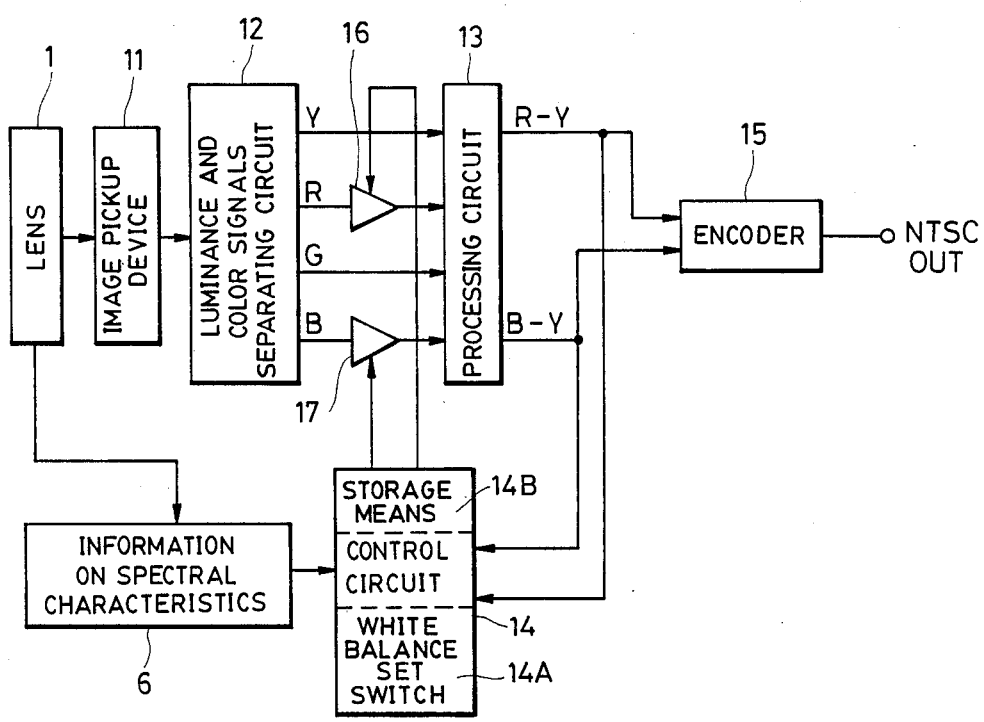
FIG. 4 is a block diagram showing one example of the construction of a white balance adjusting means incorporated into the body of the video camera shown in FIG. 1.

FIG. 4 shows one example of the construction of a white balance adjusting means which may be used in the video camera shown in FIG. 1. In this figure, reference numeral 11 denotes an image pickup device such as a CCD (charge coupled device), reference numeral 12 a circuit for separating luminance and color signals, reference numeral 13 a processing circuit, reference numeral 14 a control circuit, and reference numeral 15 an encoder. The light image of the object is formed on the image receiving surface of the image pickup device 11 through the aforementioned lens 1 and is converted to a color image pickup signal. The color image pickup signal is processed into luminance (Y), red (R), green (G) and blue (B) signals by the luminance and color signals separating circuit 12.

The R and the B signals are supplied to the processing circuit 13 through amplifiers 16 and 17 respectively having variable gains, and the Y and the G signals are supplied directly to the processing circuit 13. As is well known in the art, the processing circuit 13 produces color-difference signals R-Y and B-Y which are delivered to the input of the encoder 15. The encoder 15 encodes the signals R-Y and B-Y to produce, for example, an NTSC color television signal output.

The control circuit 14 includes a white balance set switch 14A. When the white balance is to be adjusted, the camera is directed at a white object and the set switch 14A is then turned on, thereby controlling the control circuit 14 to control the gains of the amplifiers 16 and 17 such that each of the color-difference signals R-Y and B-Y is made zero. The control circuit 14 also includes a storage means 14B for holding the above described controlled state or gains of the amplifiers 16 and 17 when the switch 14A is turned off.

The control signal thus stored in the storage means 14B of the control circuit 14 is corrected on the basis of the information on the spectral characteristics of each lens, which is supplied through the afore-mentioned code plate 6. The control circuit 14 is, for example, so constructed as to generate a control signal that is matched with the spectral characteristics of the standard lens. For example, if an interchangeable lens, which has red-light transmission characteristics relatively higher than that of the standard lens is mounted on the camera body 2, the control signal to be applied to the amplifiers 16 and 17 from the control circuit 14 is corrected in such a manner that the ratio of the gain of the amplifier 16 to that of the amplifier 17 is relatively decreased.

Thus, the output signals from the processing circuit 13 are corrected and the encoder 15 produces a color picture signal having a proper white balance irrespective of the differences in the spectral characteristics of each of the interchangeable lenses that may be mounted on the camera body. It is to be noted that, while in the above embodiment, the information transmitting means, namely the signal pin 1A, incorporated in the interchangeable lens and the detecting means, namely the pin 3, lever 4 and code plate 6, incorporated into the camera body have a mechanical structure, optical patterns or electronic storage means (such as a ROM), which electrically store information on spectral characteristics, may be disposed in the interchangeable lens such that they serve as information transmitting means. In such case the detecting means incorporated in the body of the video camera may corresponding comprise an optical detecting means or a microcomputer for reading the information stored in the storage means.

With reference to FIGS. 5 through 13, a description will now be provided of a second preferred embodiment of the present invention in which an electrical storage means having stored information on spectral characteristics as described above is incorporated in the interchangeable lens in such a manner that the information stored in the storage means is detected by the camera body. In the figures that are referred to below, the same reference numerals are used to denote the same or corresponding elements that have the same functions as those of the embodiment shown in FIGS. 1 through 4, for the sake of simplicity.

Figure 5:
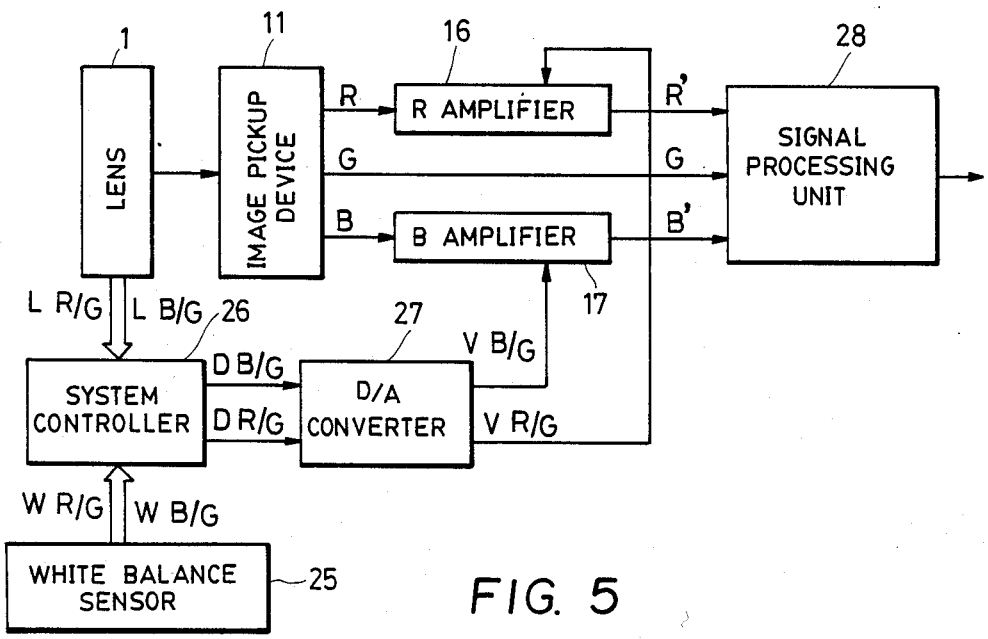
FIG. 5 is a block diagram showing a second embodiment of the image pickup system having a white balance adjusting means.

FIG. 5 is a block diagram showing the second embodiment of this invention. In FIG. 5, reference numerals 16 and 17 denote the R and B amplifiers for amplifying red and blue signals R and B output from the image pickup device 11, and for producing amplified signals R' and B' respectively. Reference numeral 25 denotes a white balance sensor circuit in an automatic white balance follow up system for detecting the color temperature of a light source. A sensor in the sensor circuit 25 is arranged in such a manner that it is exposed to the light surrounding the image pickup device which is averaged through an achromatic color filter. Reference numeral 26 denotes a system controller for outputting voltage control signals $D^R/_G$ and $D^B/_G$ having digital values and controlling gains of the R and B amplifiers 16 and 17 on the basis of digital data sent from the lens 1 and the white balance sensor circuit 25. Reference numeral 27 denotes a D/A converter for converting the digital voltage control signal $D^R/_G$ and $D^B/_G$ obtained by the system controller 26 to analog voltages $V^R/_G$ and $V^B/_G$. Reference numeral 28 denotes a signal processing unit for processing signal R', G and B' having color balances which are adjusted through the R amplifier 16 and B amplifier 17 into a desired signal.

Figure 6:
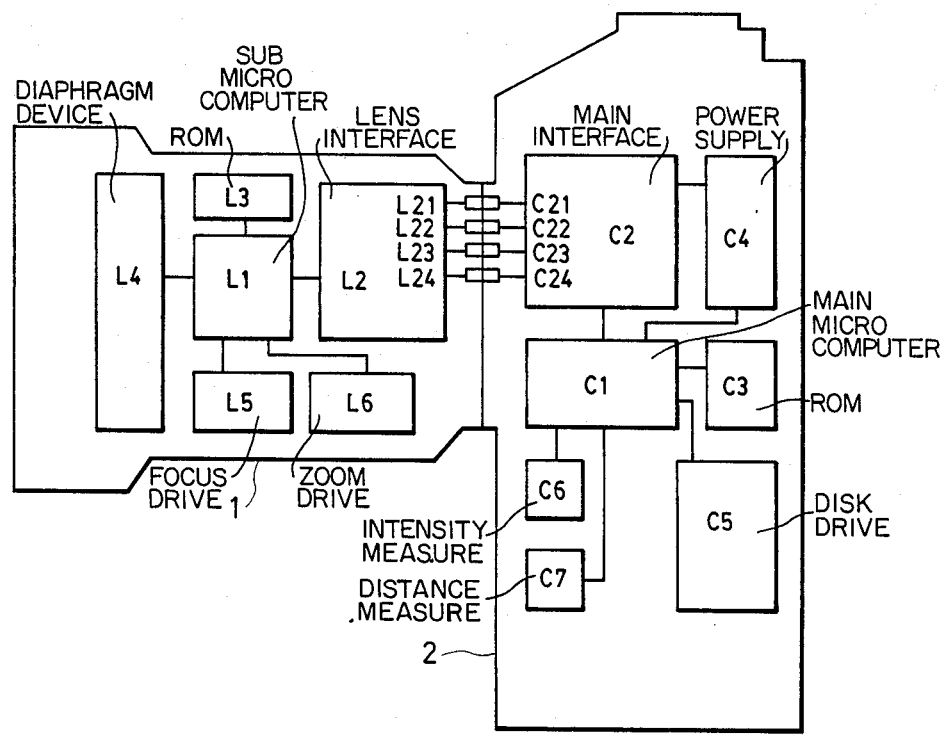
FIG. 6 is a block diagram of a lens and a camera body, illustratively showing apparatus providing communication between the lens and the camera body of the embodiment shown in FIG. 5.

FIG. 6 is a block diagram of the lens 1 and the camera body 2, showing a construction providing communication between the lens 1 and the camera body 2 of the embodiment shown in FIG. 5. In this figure symbol C1 denotes a main microcomputer incorporated into the camera body 2, symbol C2 a main interface, symbol C21 a power output terminal, symbol C22 a data terminal, symbol C23 a busy terminal, and C24 a ground (GND) terminal. Symbol C3 denotes a ROM in which the program for the main microcomputer C1 is stored, symbol C4 a power supply circuit, symbol C5 a disk drive unit for recording picture signals on a video floppy disk and disposed in the camera body 2, symbol C6 a unit for measuring the intensity of light and symbol C7 a unit for measuring the distance to the object. The lens 1 is detachably mounted on the camera body 2. Symbol L1 denotes a sub-microcomputer incorporated into the lens 1, symbol L2 a lens interface, symbol L21 a power input terminal, symbol L22 a data terminal, symbol L23 a busy terminal, symbol L24 a ground (GND) terminal, symbol L3 a ROM which will be described later an in which various information on the lens 1 and the program for the sub-microcomputer are stored, symbol L4 a diaphragm driving unit, symbol L5 a focus driving unit and symbol L6 a zoom driving unit.

With reference to FIG. 7, a description will be provided below of the various information on the lens 1 which is stored in the ROM L3 of the lens 1. FIG. 7 is a table showing from the left to the right: commands which are sent from the camera body 2 to the lens 1 through the data terminals C22 and L22; the level, operand, and code of each command; the content thereof; the number of bytes of the answer data which is sent from the lens 1; and the kind of each data which is assigned to each byte. In this table, "←" which is shown in the column of the KIND OF DATA EACH BYTE indicates that the content is the same as that labeled CONTENT of the column of the corresponding test command.

The data that is read in accordance with a command named "Test Loss" is data on the transmittance of each lens. The content that is read in accordance with a command named "Test Color" is the spectral characteristic of each lens and is constituted by two-byte data indicating $L^R/_G$ and $L^B/_G$, obtained from the percentage of R, G and B factors of light transmitted through the lens. In addition, the content that is read in accordance with a command names "Test ID" is data constituted as a whole by 7 bytes which are suitably allocated to each item of information on the manufacturer, type and functions of each lens being used.

Figure 8:
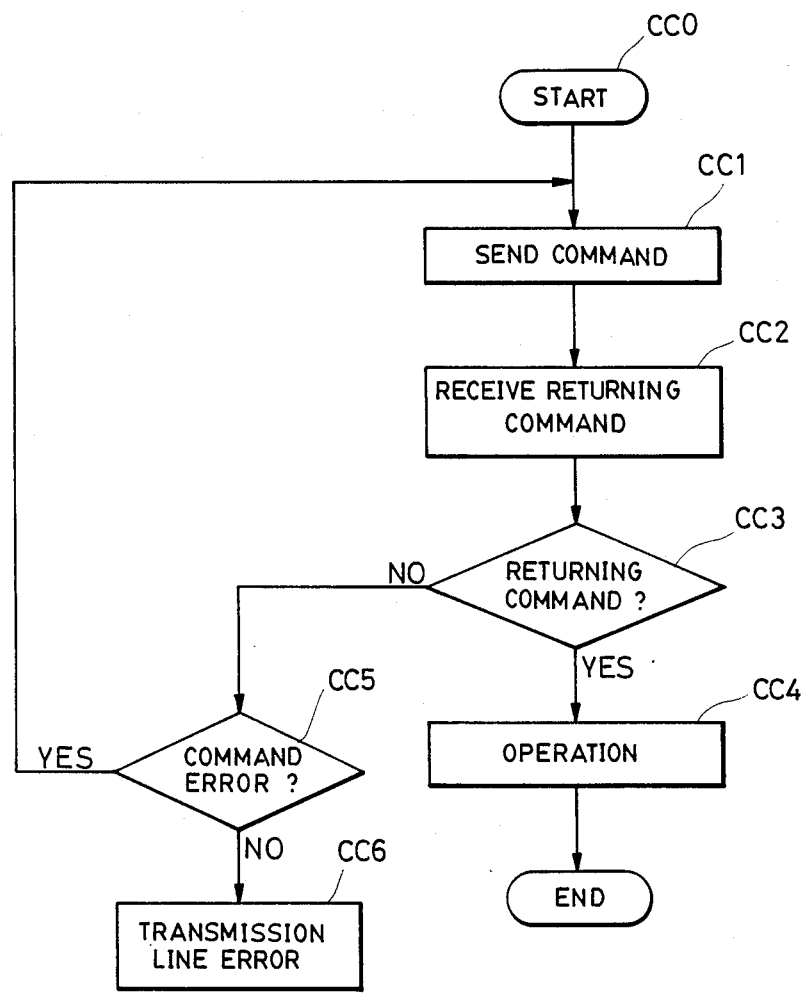
FIG. 8 is a flowchart showing certain operations which are executed by a microcomputer incorporated in the camera body of the embodiment shown in FIG. 5.
Figure 9:
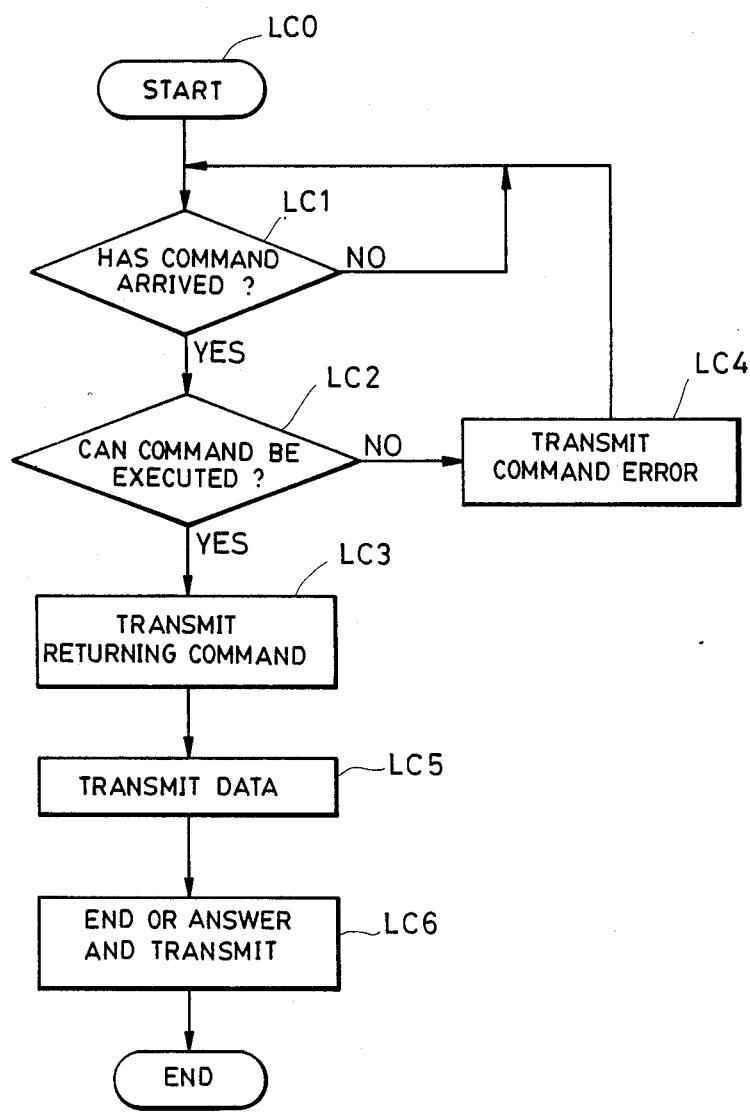
FIG. 9 is a flowchart showing certain operations, which are executed by a microcomputer incorporated in the lens of the embodiment shown in FIG. 5.

With reference to FIGS. 8 and 9, a description will now be provided of the sequence by which the commands and the data shown in FIG. 7 are communicated between the camera body 2 and the lens 1. FIG. 8 is a flowchart of the operation that is executed by the microcomputer C1 incorporated into the camera body 2 and FIG. 9 is a flowchart of the operation that is executed by the microcomputer L1 incorporated into the lens 1.

The operation of the camera body 2 is started and the operation of the flowchart in FIG. 8 is begun from Step CC0 in FIG. 8, whereupon Step CC1 shown in FIG. 8 is executed, thereby transmitting one of the commands listed in FIG. 7 from the camera body 2 to the lens 1. On the other hand, the operation of the lens 1 is started and the operation of the flowchart in FIG. 9 is begun from Step LC0 shown in FIG. 9, thus executing Step LC1. In step LC1 shown in FIG. 9, a judgment is made as to whether or not each command has arrived from the camera body 2 to the lens 1. When the command is not transmitted, the same loop is repeated and when the command is transmitted, the process proceeds to Step LC2 in FIG. 9. Specifically, when the operation of the camera body 2 is started and Step CC1 in FIG. 8 is executed, the microcomputer L1 of the lens 1 receives the transmitted command and the process proceeds from Step LC1 in FIG. 9 to Step LC2 therein. The lens 1 decides in Step LC2 in FIG. 9 whether or not the transmitted command can be executed. When the command can be executed, the process proceeds to Step LC3 in FIG. 9. However, when the command cannot be executed, the process proceeds to Step LC4 in FIG. 9.

In Step LC3 in FIG. 9, the command which is sent from the camera body 2 to the lens 1 is directly transmitted from the lens 1 to the camera body 2 (a return command). After executing Step LC3 in FIG. 9, the lens 1 transmits the return command and the operation of the lens 1 then proceeds to Step LC5 such that the data designated by the commands is sent to the camera body 2. Step LC4 in FIG. 9 is a step for transmitting data indicating "COMMAND ERROR" to the camera body 2. In other words, the operations from Steps LC2 through LC5 in the flowchart of FIG. 9 show that, if it is possible to execute the command which is transmitted from the camera body 2 to the lens 1, the lens 1 directly sends back the received command to the camera body 2. However, if it is impossible to execute the command which is transmitted from the camera body 2 to lens 1, the lens 1 transmits to the camera body 2 the data on "COMMAND ERROR" indicating that the received command cannot be executed by the lens 1. At this time, as shown in FIG. 8, the camera body 2 is in a state wherein it receives the command transmitted from the lens 1, and specifically, the camera body 2 receives the data which is transmitted from the lens 1 to the camera body 2 by the lens 1 executing either Steps LC3 or LC4 shown in FIG. 9.

Next, as shown in Step CC3 in FIG. 8, the camera body 2 determines whether or not the data transmitted from the lens 1 to the camera body 2 conforms to the command which has been sent to the lens 1 in Step CC1 in FIG. 8. In this Step CC3, when they conform, the camera body 2, as shown in Step CC4 in FIG. 8, receives data next to be transmitted and operates in accordance with the received data, thus completing the entire process of the flowchart. Conversely, when the data and command do not conform, the process of the flowchart proceeds from Step CC3 in FIG. 8 to Step CC5 therein, and in Step CC5 in FIG. 8 the camera body 2 determines whether or not the data transmitted from the lens 1 to the camera body 2 is data showing "COMMAND ERROR". When the data which is transmitted from the lens 1 to the camera body 2 in Step CC3 in FIG. 8 is judged to be "COMMAND ERROR", the process returns to Step CC1 in FIG. 8, and the same command is selected and sent again.

On the other hand, when the transmitted data is not judged to be "COMMAND ERROR" in Step CC5 FIG. 8, there are two possibilities, one being that the command which should have been sent from the camera body 2 to the lens 1 has been transmitted to the lens 1 error, and the other that the command which should have been transmitted from the lens 1 to the camera body 2 has been transmitted to the camera body 2 in error. No matter which of these events may occur, since some error has arisen in a transmission line, the process of the flowchart stops in this Step CC6, in FIG. 8.

By the construction and method that are described above with reference to FIGS. 5 through 9, each of the digital data $L^R/_G$ and $L^B/_G$ representing the spectral characteristics of the lens 1 is transmitted from the lens 1 to the camera body 2 and is supplied to the system controller 26 shown in FIG. 5. The system controller 26 adds the digital data $L^R/_G$ and $L^B/_G$ to the digital data $W^R/_G$ and $W^B/_G$ which are supplied from the white balance sensor circuit 25, and produces the digital voltage control signals $D^R/_G$ and $D^B/_G$ which are respectively converted through the D/A converter 27 to the control voltages $V^B/_G$ and $V^R/_G$, for controlling the gains of the R amplifier 16 and the B amplifier 17, thereby correcting the white balance while taking into account the spectral characteristics of the lens 1.

Therefore, in accordance with this embodiment, suitable adjustment of the white balance can consistently be performed according to the spectral characteristics of each interchangeable lens.

Figure 10:
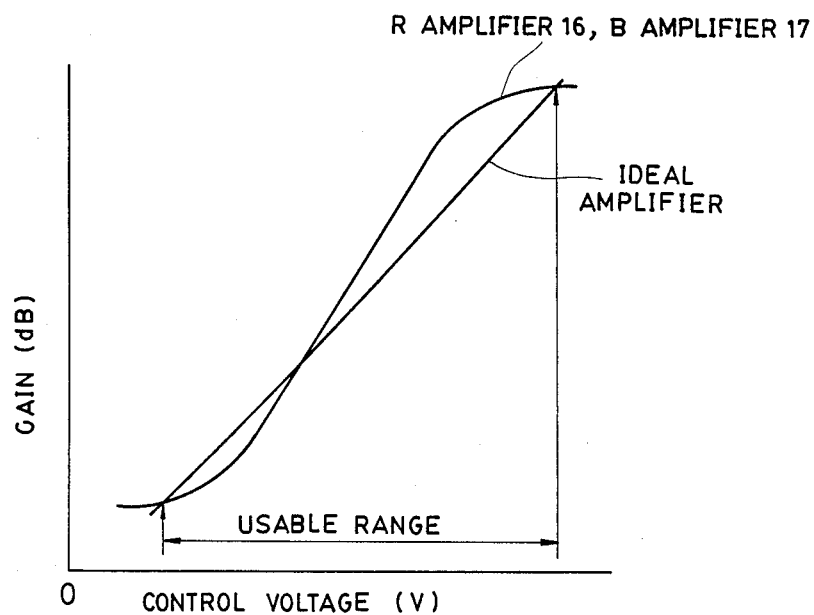
FIG. 10 is a graph showing the relationship between the gain and the control voltage of a red (R) amplifier and a blue (B) amplifier shown in FIG. 5.

However, in the above construction shown in FIG. 5, in a case where the control voltage $V^R/_G$ and $V^B/_G$ for controlling the gains of the R amplifier 16 and the B amplifier 17 are varied over a wide range, the gains of the R amplifier 16 and the B amplifier 17 may lose linearity with respect to the control voltages. In other words, as shown in FIG. 10, the gains of the R amplifier 16 and the B amplifier 17 tend to be saturated with respect to the control voltage value, and the saturation makes the gains of the R amplifier 16 and the B amplifier 17 different from those required for suitably adjusting the white balance. Therefore, errors may be contained in the gains, thereby causing the white balance to be unavoidably inaccurate.

In order to mitigate this disadvantage, it is preferable that the spectral characteristic of the lens 1 transmitted from the lens 1 and the signal obtained from the white balance sensor circuit 25 be added by the system controller 26 so as to compute the gains of the R amplifier 16 and the B amplifier 17, and the gains thus computed $^R/_{G'}$ and $^B/_{G'}$ are corrected to the voltage control signals $D^B/_G$ and $D^R/_G$ while taking into account the characteristics of the R amplifier 16 and the B amplifier 17 shown in FIG. 10.

Figure 11:
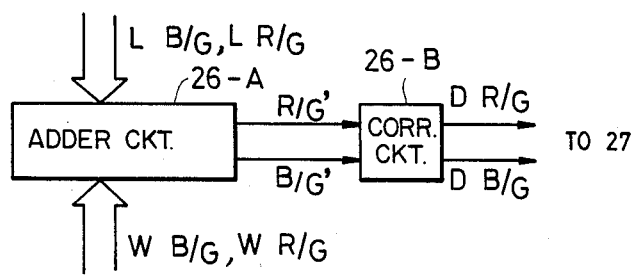
FIG. 11 is a block diagram showing the construction of a system controller which performs a control function while taking into account the characteristics of a red (R) amplifier and a blue (B) amplifier shown in FIG. 10.

The construction of the system controller 26 having the above described function will be explained with reference to FIG. 11. In FIG. 11, symbol 26-A denotes an adder circuit for adding the digital data $L^R/_G$ and $L^B/_G$, which are transmitted from the lens 1, to the digital data $W^R/_G$ and $W^B/_G$, which are supplied from the white balance sensor circuit 25, respectively. Symbol 26-B denotes a correction circuit for correcting the data $R/_{G'}$ and $B/_{G'}$ computed in the adder circuit 26-A to digital values $D^R/_G$ and $D^B/_G$ representing the control voltages while taking into account the control voltage-gain characteristics of the R amplifier 16 and the B amplifier 17.

As described above, the adder circuit 26-A and the correction circuit 26-B enable the control voltages to be obtained while taking into account the control voltage-gain characteristics of the R amplifier 16 and the B amplifier 17.

The correction circuit 26-B may comprise a ROM or other table that stores correction data for correcting the gains $R/_{G'}$ and $B/_{G'}$.

In accordance with the above described embodiment, however, while it is possible to make an adjustment of the white balance free from the change in the spectral characteristics of each lens, it is necessary, in using specific types of lenses, to vary the amount of correction so as to compensate for the spectral characteristics of each lens in accordance with the color temperature of a light source.

Figure 12:
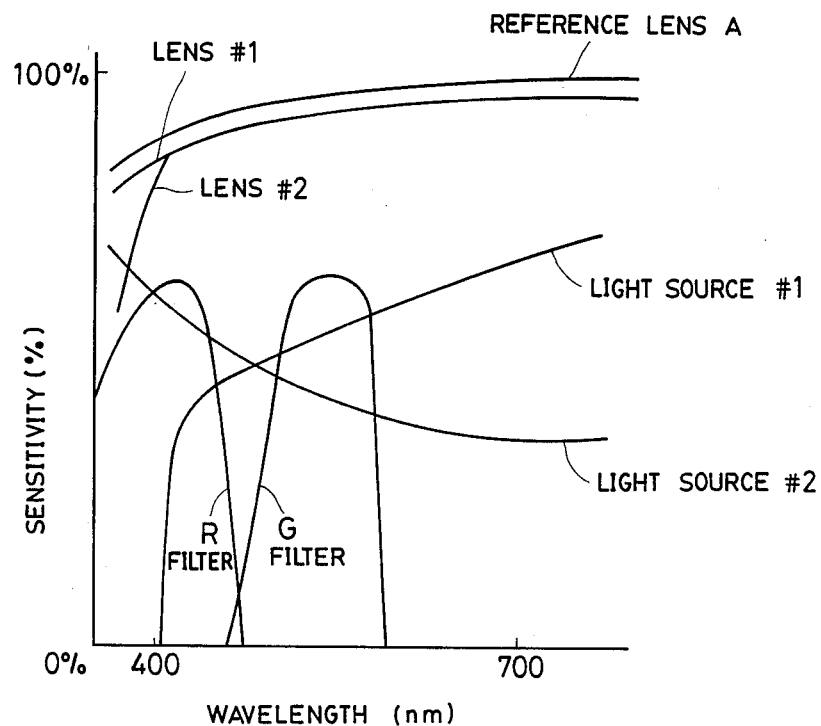
FIG. 12 is a graph showing each of the spectral characteristics of two different light sources and red (R) and green (G) color filter lenses.

The determination of the amount of correction will be described below with reference to FIG. 12. In FIG. 12, curves characteristic of reddish and bluish light sources #1 and #2 show a spectral distribution for the light sources which differ from others in color temperature. The curves for the R filter and the G filter show the transmittance characteristics of the red filter and the green filter disposed in front of the white balance sensor. The curves for a reference or standard lens A, and other lenses #1 and #2 show the spectral characteristics of each of the lenses. As an example, a lens having substantially the same spectral distribution as the reference lens A, such as for the lens #1 as shown in FIG. 12, does not need an amount of correction which is different from that for the reference lens A in correspondence with each light source (a lens which does not need its spectral characteristics to be corrected). Specifically, the amount of correction with respect to the light source #1 shown in FIG. 12 is not very much different from the correction needed for the light source #2. However, since the sensitivity of lens #2 to short wavelengths is far lower than that of the reference lens A, a different amount of correction is required for each of the light sources #1 and #2. Specifically, while the amount of correction of the red component R with respect to that of the green component G may be small for light source #1 having a low color temperature, the amount of correction must be made large for the light source #2 having a high color temperature.

In other words, the sensitivity of an image pickup system including the lens #2 (shown in FIG. 12) to the bluish light source #2 having a high color temperature is lower than that to the reddish light source #1 having a low color temperature. Thus, it is necessary to increase the correction of the spectral characteristics of the lens #2 under the light source #2 and to amplify the ratio of the red signal to the green signal.

A description will be provided below with reference to FIG. 13 of one embodiment which has the function of compensating for the white balance adjustment of lenses of a type the spectral characteristic of which has the curve #2 shown in FIG. 12.

Figure 13:
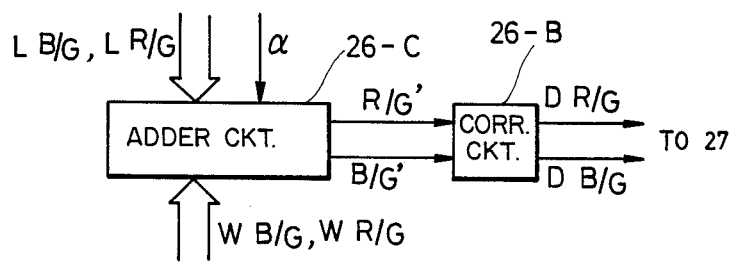
FIG. 13 is a block diagram showing the construction of a system controller which performs a control function while taking into account the spectral characteristics of the filter lenses having characteristics shown in FIG. 12.

In the description of the embodiment shown in FIG. 13, reference is made to the system controller 26 which is arranged in such a manner as to transmit to the camera body 2 a correction coefficient $\alpha$ for correcting the data from the lens 1 in correspondence with the color temperature of a light source as well as the data $L^R/_G$ and $L^B/_G$ delivered from the lens 1, thereby carrying out an appropriate white balance adjustment under a light source having any color temperature on the basis of the data $L^B/_G$, $L^R/_G$, and the correction coefficient $\alpha$ which are sent from the lens 1 and the data $W^R/_G$ and $W^B/_G$ which are sent from the white balance sensor circuit 25. FIG. 13 is a block diagram of another embodiment of the system controller 26 shown in FIG. 11.

In FIG. 13, symbol 26-C is an adder circuit using a correction coefficient for producing the voltage control signals of $R/_{G'}$ and $B/_{G'}$ for amplifiers 16 and 17 on the basis of the data $L^R/_G$ and $L^B/_G$ on spectral characteristics supplied from the lens 1, the correction coefficient $\alpha$ and the outputs $W^R/_G$ and $W^B/_G$ supplied from the white balance sensor circuit 25. The control signals $R/_{G'}$ and $B/_{G'}$ which are obtained from this circuit block 26-C are subjected to correction in accordance with the difference in the color temperature of each light source, and are represented by the following equations (1) and (2):

$$R/_{G'} = W^R/_G + ((W^R/_G \cdot \alpha) + L^R/_G) \quad (1)$$

$$B/_{G'} + W^B/_G + ((W^B/_G \cdot \alpha) + L^B/_G) \quad (2)$$

where as described above $W^R/_G$ and $W^B/_G$ are the data on the color temperature of the light source obtained from the white balance sensor circuit 25. For example, if:

$$W^R/_G = 4 \text{ dB}, L^R/_G = 1 \text{ dB and } \alpha = 0.05$$

it follows that the portion of the equation (1) in parentheses becomes:

$$(W^R/_G \cdot \alpha) + L^R/_G = (4 \times 0.05) + 1 = 1.2 \text{ dB}$$

hence $R/_{G'}$ becomes 5.2 dB.

Specifically, the amount of correction dependent on color temperature to $W^R/_G$ (or $W^B/_G$), which can be represented for example by $(W^R/_G \times \alpha = 0.2 \text{ dB})$, and which is the amount of correction containing that of the correction of each lens, is added to the original amount of correction of the lens, 1 dB, to obtain $R/_{G'}$. It will be found from this result that a further adjustment is applied to the amount of correction in accordance with the color temperature of each light source at the time of image pick up.

Symbol 26-B denotes the correction circuit similar to that shown in FIG. 11. These correction blocks 26-C and 26-B enable the color correction of the lens in response to the difference in the color temperature of each light source at the time of image pick up as described above.

In accordance with the above embodiment, even if the color temperature of each light source varies at the time of image pick up, it is possible to consistently make a suitable white balance adjustment.

While this embodiment employs the ROM L3 as a storage means for electrically storing the spectral characteristics of each lens 1, a bubble memory or other magnetic memory may also be used. In addition, although the microcomputer C1 and the interface C2 which are shown in FIG. 6 and operate in accordance with the flowchart shown in FIG. 8 are used as a means for reading the data stored in the storage means, this means may also be constituted by other hard logic elements.

In the above described embodiment, the interchangeable lens is arranged in such a manner that it stores the information on spectral characteristics $L^R/_G$ and $L^B/_G$. However, the lens may be arranged such that it stores information on color balance such as $^R/_B$ as a kind of information on spectral characteristics in addition to the former information. Moreover, this embodiment is arranged such that the manufacturer and type of each lens can be identified in accordance with the command Test ID and the spectral characteristics of the lens can be identified in accordance with the command Test Color. However, instead of the command Test Color, all data of the spectral characteristics of a plurality of interchangeable lenses may be stored in the ROM C3 of the camera body 2 and the information on the spectral characteristics of the plurality of interchangeable lenses which are stored in the ROM C3 of the camera body 2 may be retrieved in accordance with the information on the manufacturer and the type of the lens which is read by the command Test ID. This method allows the amount of information stored in the lens to be reduced.

As described above, in accordance with the preferred embodiments of the present invention, an image pickup system such as a video camera having adjusting means for adjusting a white balance of a color image signal, further comprises means providing information on spectral characteristic of each lens and detecting means for detecting the information provided by the information providing means, thereby enabling the adjusting means to make a proper adjustment for the white balance of each lens.

Additionally, the interchangeable lens has an information transmitting means for transmitting information on the spectral characteristics inherent in each lens to the white balance adjusting means incorporated in the video camera body, whereby it is unnecessary to repeat the adjustment of the white balance of the video camera each time lenses are changed, thus improving operability.

While this invention has been described in conjunction with specific embodiments thereof, it is apparent that many alternatives, modifications and variations may be made by those skilled in the art. Accordingly, it is intended to embrace all such alternatives, modifications and variations as fall within the spirit and broad scope of the appended claims.

What is claimed is:

1. An image pickup system comprising:
   (a) a camera body;
   (b) a lens detachably mounted on said camera body, said lens including optical means for forming an image of an object, said optical means having a predetermined spectral characteristic;
   (c) image pickup means in said camera body for receiving the image and producing an image signal in response thereto;
   (d) information provision means for providing information on the spectral characteristic of said optical means, said information provision means including a memory which is provided in said lens and adapted to store information on said spectral characteristic, and a first microcomputer provided in said lens and adapted for reading the information out of said memory and for outputting the read information to the outside of said lens; and
   (e) control means for controlling the image signal on the basis of the information.

2. The system according to claim 1, wherein said image pickup means produces a color image signal which includes a plurality of color components, and said control means controls selected ones of said color components of the image signal on the basis of said information.

3. The system according to claim 2, wherein said control means controls the relative magnitudes of the color components of the color image signal on the basis of said color components and said information on the spectral characteristic of said optical means.

4. The system according to claim 2, further comprising:
   detection means for detecting the color temperature of said object and for producing information on the detected color temperature;
   wherein said control means controls the relative magnitudes of the color components of the color image signal on the basis of the information on the color temperature of said object and the information on the spectral characteristic of said optical means.

5. An image pickup system according to claim 1, further comprising means for electrically connecting said first microcomputer and said control means to each other when said lens is mounted on said camera body.

6. An image pickup system according to claim 1, further comprising a second microcomputer adapted for conducting data communication between itself and said first microcomputer in said lens.

7. An image pickup system according to claim 6, wherein said second microcomputer commences said data communication with said first microcomputer when said lens is mounted on said camera body.

8. An image pickup system according to claim 1, wherein said memory includes a read-only memory.

9. A signal generation system comprising:
   (a) a first unit including:
      (1) conversion means for producing an electrical signal in response to incident radiation; and
      (2) processing means for processing said electrical signal into a predetermined output, said processing means including control means for controlling said output; and
   (b) a second unit detachably mountable on said first unit and including:
      (1) conducting means for conducting radiation to said conversion means, said conducting means having a predetermined radiation-conductive characteristic; and
      (2) information providing means for providing information on the radiation-conductive characteristic of said conducting means, said information providing means including a memory for storing information on said radiation-conductive characteristic and a first microcomputer for reading the information out of said memory and for outputting the information;
   said control means being responsive to said information provided by said information providing means to control the output of said processing means.

10. The system according to claim 9, wherein said conversion means produces an electrical signal which includes a plurality of different kinds of signal components said processing means processes each of said signal components of the electrical signal produced by said conversion means to produce the predetermined output, and said control means controls the relative magnitudes of signal components included in said output of said processing means.

11. The system according to claim 10, wherein said control means controls the relative magnitudes of the signal components included in the output of said processing means on the basis of the signal components included in the output of said processing means and the information on the conductive characteristic of said conducting means.

12. The system according to claim 10, further comprising:
  detection means for detecting a characteristic of the radiation to be conducted to said conversion means by said conducting means and for providing information on the detected characteristic of the radiation;
  wherein said control means controls the relative magnitudes of the signal components included in the output of said processing means on the basis of the information provided by said information providing means and said detection means.

13. A signal generation system according to claim 9, further comprising means for electrically connecting said first microcomputer and said control means to each other when said second unit is mounted on said first unit.

14. A signal generation system according to claim 9, wherein said control means includes a second microcomputer for conducting data communication between itself and said first microcomputer.

15. A signal generation system according to claim 14, wherein said second microcomputer is adapted to commence said data communication with said first microcomputer when said second unit is mounted on said first unit.

16. A signal generation system according to claim 9, wherein said memory includes a read-only memory.

17. A color video camera comprising:
  (a) a camera body;
  (b) a color image pickup element in said camera body for receiving a color image and for producing a color image signal in response thereto;
  (c) a processing circuit in said camera body for processing the color image signal into a plurality of color component signals;
  (d) an adjusting circuit in said camera body for adjusting the relative magnitudes of said color component signals produced by said processing circuit;
  (e) a control circuit in said camera body for controlling said adjusting circuit;
  (f) a lens assembly detachably mountable on said camera body;
  (g) a leans optical system in said lens assembly for forming said color image on said color image pickup element, said lens optical system having a predetermined spectral characteristic;
  (h) memory means associated with said lens assembly for storing information on said spectral characteristic of said lens optical system, said memory means including a first microcomputer for processing said information stored in said memory means; and
  (i) connecting means for connecting said memory means and said control circuit;
  wherein said control circuit controls said adjusting circuit on the basis of the information stored in said memory means.

18. The camera according to claim 17, wherein said control circuit detects an unbalance in the color component signals, and controls said adjusting circuit to adjust the relative magnitudes of the color component signals on the basis of the unbalance detected by said control circuit.

19. The camera according to claim 17, further comprising a sensor for detecting the color temperature of an object, and wherein said control circuit controls said adjusting circuit to adjust the relative magnitudes of the color component signals on the basis of the color temperature detected by said sensor.

20. The camera according to claim 17, wherein said first microcomputer reads out the stored information from said memory means, and said control circuit controls said adjusting circuit in response to the information read out from said memory by said first microcomputer.

21. The camera according to claim 20, wherein said memory means includes a read-only memory.

22. An optical unit for an image pickup apparatus having converting means for converting radiation to an electrical signal and processing means for processing said electrical signal, said unit comprising:
  (a) optical means for introducing said radiation into said converting means, said optical means having a predetermined spectral characteristic; and
  (b) transmitting means for transmitting information corresponding to the spectral characteristic of said optical means to said processing means, said transmitting means including a memory for storing information corresponding to said spectral characteristic and a first microcomputer for reading the information out of said memory and for outputting the read information.

23. A unit according to claim 22, wherein said optical means includes a lens.

24. A unit according to claim 23, wherein said transmitting means is arranged to transmit information corresponding to the spectral characteristic of said lens to said processing means.

25. A unit according to claim 24, wherein said transmitting means includes a terminal for electrically transmitting said information corresponding to the spectral characteristic of said lens to the exterior of said unit.

26. An optical unit according to claim 22, wherein said memory includes a read-only memory.

27. A color video camera body for use with a lens assembly detachably mounted thereon and having a lens optical system for producing a color image, and an information source for providing information on spectral characteristics of a plurality of different kinds of said lens optical system, said camera body comprising:
  (a) a color image pickup element for producing a color image signal in response to said color image produced by said lens optical system;
  (b) a processing circuit for processing said color image signal into a plurality of color component signals;
  (c) an adjusting circuit for adjusting the relative magnitudes of said color component signals;
  (d) a microcomputer for generating microcomputer commands for designating a specific one of said spectral characteristics corresponding to the kind of said lens optical system;
  (e) a detection circuit for detecting the information on the designated one of said spectral characteristics from said information source; and (f) a control circuit responsive to the detected information to control said adjusting circuit.

28. A lens assembly comprising:
(a) a lens housing;
(b) a lens optical system mounted in said housing for forming a color image in response to colored light, said optical system having a predetermined spectral characteristic;
(c) memory means in said housing for storing information on the spectral characteristic of said optical system; and
(d) a microcomputer in said housing for reading out the information stored in said memory means and for processing the information to convert said information to another kind of information suitable for transmission.

29. An interchangeable lens for a color video camera, comprising:
(a) a lens housing;
(b) a lens optical system mounted in said housing for forming a color image in response to colored light, said optical system having a predetermined spectral characteristic;
(c) a memory circuit in said housing for storing information on said spectral characteristic of said optical system;
(d) a read-out circuit for reading out the stored information from said memory circuit, said read-out circuit including a microcomputer for converting the information read out from said memory circuit into a signal suitable for transmission and for transmitting said signal; and
(e) at least one terminal to output a signal indicating that said microcomputer is conducting said transmission.

30. An image pickup system comprising:
(a) a camera body;
(b) a lens detachably mounted on said camera body, said lens including optical means for forming an image of an object, said optical means having a predetermined spectral characteristic;
(c) image pickup means in said camera body for receiving the image and producing an image signal in response thereto, wherein said image pickup means produces a color image signal which includes a plurality of color components;
(d) information provision means for providing information on the spectral characteristic of said optical means, wherein said information provision means includes mechanical means provided on said lens and having a dimension corresponding to the spectral characteristic of said optical means, and conversion means provided on said camera body and producing electrical information corresponding to the mechanical dimension of said mechanical means, said mechanical means and said conversion means being arranged to engage with each other when said lens is mounted on said camera body; and
(e) control means for controlling selected ones of the color components of the image signal on the basis of the electrical information produced by said conversion means.

31. A signal generation system comprising:
(a) a first unit including:
  (1) conversion means for producing an electrical signal in response to incident radiation; and
  (2) processing means for processing said electrical signal into a predetermined output, said processing means including control means for controlling said output; and
(b) a second unit detachably mountable on said first unit and including:
  (1) conducting means for conducting radiation to said conversion means, said conducting means having a predetermined radiation-conductive characteristic; and
  (2) information providing means for providing information on the radiation-conductive characteristic of said conducting means, wherein said information providing means includes mechanical means having a dimension corresponding to the radiation-conductive characteristic of said conducting means;
said control means being responsive to said mechanical means and controlling said output of said processing means on the basis of the dimension of said mechanical means.

32. The system according to claim 31, wherein said control means in said processing means includes:
a conversion mechanism for producing an electrical information signal corresponding to the dimension of said mechanical means; and
circuit means for controlling said output of said processing means on the basis of said information signal produced by said conversion mechanism.

33. An optical unit for an image pickup apparatus having converting means for converting radiation to an electrical signal and processing means for processing said electrical signal, said unit comprising:
(a) optical means for introducing said radiation into said converting means, wherein said optical means includes a lens;
(b) transmitting means for transmitting information corresponding to the spectral characteristic of said lens to said processing means, wherein said transmitting means includes mechanical means having a mechanical dimension corresponding to the spectral characteristic of said lens.

* * * * *

UNITED STATES PATENT AND TRADEMARK OFFICE
CERTIFICATE OF CORRECTION

PATENT NO. :   4,851,897

DATED      :   July 25, 1989

INVENTOR(S) :  Inuma, et al.

It is certified that error appears in the above-identified patent and that said Letters Patent is hereby corrected as shown below:

COLUMN 2:

Line 38, change "mean" to --means--.

COLUMN 3:

Line 50, change "therefore" to --therefor--.

Line 66, change "height the" to --height, the--.

COLUMN 4:

Line 26, change "above described" to --above-described--.

Line 39, change "changed in" to --changed into--.

UNITED STATES PATENT AND TRADEMARK OFFICE
CERTIFICATE OF CORRECTION

PATENT NO. : 4,851,897           Page 2 of 4
DATED : July 25, 1989
INVENTOR(S) : Inuma, et al.

It is certified that error appears in the above-identified patent and that said Letters Patent is hereby corrected as shown below:

COLUMN 5:

Line 10, change "above" to --above- --.

Line 16, change "afore-mentioned" to --aforementioned--.

Line 22, change "lens" to --lens,--.

Line 44, change "corresponding" to --correspondingly--.

COLUMN 6:

Line 4, change "$D^B/_G$" to --$D^B/_{G,}$--.

Line 12, change "processing signal R', G and B'" to --processing signals R', G and B'--.

Line 18, change "figure" to --figure,--.

Line 62, change "names" to --named--.

COLUMN 7:

Line 37, change "commands" to --command--.

COLUMN 8:

Line 12, change "error" to --in error--.

Line 62, change "above described" to --above-described--.

UNITED STATES PATENT AND TRADEMARK OFFICE
CERTIFICATE OF CORRECTION

PATENT NO. : 4,851,897  Page 3 of 4
DATED : July 25, 1989
INVENTOR(S) : Inuma, et al.

It is certified that error appears in the above-identified patent and that said Letters Patent is hereby corrected as shown below:

COLUMN 9:

Line 14, change "above described" to --above-described--.

COLUMN 10:

Line 25, change "$^B/_G + W^B/_G + ((W^B/_G \cdot \alpha) + L^B/_G \quad \ldots (2)$"

to --$^B/_G = W^B/_G + ((W^B/_G \cdot \alpha) + L^B/_G \quad \ldots (2)$--

COLUMN 11:

Line 3, change "above described" to --above-described--.

COLUMN 12:

Line 66, change "nents" to --nents,--.

UNITED STATES PATENT AND TRADEMARK OFFICE
CERTIFICATE OF CORRECTION

PATENT NO. : 4,851,897
DATED : July 25, 1989
INVENTOR(S) : Inuma, et al.

It is certified that error appears in the above-identified patent and that said Letters Patent is hereby corrected as shown below:

COLUMN 13:

Line 9, change "conductive characteristic" to --radiation-conductive characteristic--.

Line 55, change "leans optical system" to --lens optical system--.

COLUMN 16:

Line 48, change "lens;" to --lens; and--.

Signed and Sealed this

Fourteenth Day of January, 1992

Attest:

HARRY F. MANBECK, JR.

*Attesting Officer*     *Commissioner of Patents and Trademarks*